United States Patent
Knoth et al.

(10) Patent No.: US 11,416,056 B2
(45) Date of Patent: Aug. 16, 2022

(54) POWER SENSE CORRECTION FOR POWER BUDGET ESTIMATOR

(71) Applicant: Apple Inc., Cupertino, CA (US)

(72) Inventors: Matthias Knoth, Scotts Valley, CA (US); Srikanth Balasubramanian, Los Altos, CA (US); Venkatram Krishnaswamy, Los Altos, CA (US); Ramesh B. Gunna, San Jose, CA (US)

(73) Assignee: Apple Inc., Cupertino, CA (US)

( * ) Notice: Subject to any disclaimer, the term of this patent is extended or adjusted under 35 U.S.C. 154(b) by 146 days.

(21) Appl. No.: 17/026,121

(22) Filed: Sep. 18, 2020

(65) Prior Publication Data

US 2022/0091649 A1 Mar. 24, 2022

(51) Int. Cl.
*G06F 1/28* (2006.01)
*G06Q 50/06* (2012.01)
*G06F 1/3228* (2019.01)

(52) U.S. Cl.
CPC .............. *G06F 1/28* (2013.01); *G06F 1/3228* (2013.01); *G06Q 50/06* (2013.01)

(58) Field of Classification Search
CPC .......... G06F 1/28; G06F 1/3228; G06Q 50/06
See application file for complete search history.

(56) References Cited

U.S. PATENT DOCUMENTS

| 7,793,125 B2 | 9/2010 | Berry, Jr. et al. |
| 9,009,451 B2 | 4/2015 | Murray et al. |
| 9,075,614 B2 | 7/2015 | Fetzer et al. |
| 9,477,279 B1* | 10/2016 | Piszczek ................. G06F 1/206 |
| 10,684,794 B2* | 6/2020 | Tidwell ................. G06F 3/0659 |
| 2015/0033045 A1 | 1/2015 | Raghuvanshi et al. |
| 2018/0101323 A1* | 4/2018 | Sebastian ............. G06F 3/0659 |

* cited by examiner

*Primary Examiner* — Terrell S Johnson
(74) *Attorney, Agent, or Firm* — Kowert, Hood, Munyon, Rankin & Goetzel, P.C.; Scott W. Pape; Dean M. Munyon

(57) ABSTRACT

An apparatus includes an execute circuit configured to execute a plurality of operations received from a queue, as well as a power estimator circuit, and a power sensing circuit. The power estimator circuit is configured to predict power consumption due to execution of a particular operation of the plurality of operations, and to withdraw, based on the predicted power consumption, a first amount of power credits from a power credit pool. The power sensing circuit is configured to monitor one or more characteristics of a power supply node coupled to the execute circuit to generate a power value, and to deposit a second amount of power credits into the power credit pool. The second amount of power credits may be based on the power value indicating that power consumed during the execution of the particular operation is less than the predicted power consumption.

20 Claims, 8 Drawing Sheets

600

```
┌─────────────────────────────────────────────────────────────┐
│ Estimating, by a power management circuit, power consumption │
│ of an execute circuit using a particular operation of a      │
│ plurality of operations to be executed by the execute        │
│ circuit.                                                     │
│ 610                                                          │
└─────────────────────────────────────────────────────────────┘
                              │
                              ▼
┌─────────────────────────────────────────────────────────────┐
│ Withdrawing, by the power management circuit based on the    │
│ estimated power consumption, a first amount of power credits │
│ from a power credit pool.                                    │
│ 620                                                          │
└─────────────────────────────────────────────────────────────┘
                              │
                              ▼
┌─────────────────────────────────────────────────────────────┐
│ During execution of the particular operation, generating, by │
│ the power management circuit, a power value by monitoring    │
│ one or more characteristics of a power supply node coupled   │
│ to the execute circuit.                                      │
│ 630                                                          │
└─────────────────────────────────────────────────────────────┘
                              │
                              ▼
┌─────────────────────────────────────────────────────────────┐
│ Based on a comparison of the estimated power consumption and │
│ the power value, refunding, by the power management circuit, │
│ a second amount of power credits to the power credit pool..  │
│ 640                                                          │
└─────────────────────────────────────────────────────────────┘
```

FIG. 6

POWER SENSE CORRECTION FOR POWER BUDGET ESTIMATOR

BACKGROUND

Technical Field

Embodiments described herein are related to power management of an integrated circuit and, more particularly, to controlling execution of operations to limit power consumption in an execution pipeline.

Description of the Related Art

Integrated circuits continue to increase in density as semiconductor manufacturing processes improve, allowing for increased functionality on a single integrated circuit "chip." Some integrated circuits include multiple execute circuits, such as multiple processor cores and/or multiple execution pipelines within a single core. While having a plurality of execute circuits may allow an integrated circuit to have a high processing bandwidth, the plurality of execute circuits, when operating concurrently, may consume more power than a power supply and/or power distribution circuits can provide. Excessive power consumption can cause a power supply voltage to droop, which can cause malfunctions in the integrated circuit if a voltage level drops below a safe operating level.

SUMMARY

In an embodiment, an apparatus includes an execute circuit configured to execute a plurality of operations received from a queue, as well as a power estimator circuit, and a power sensing circuit. The power estimator circuit may be configured to predict power consumption due to execution of a particular operation of the plurality of operations, and to withdraw, based on the predicted power consumption, a first amount of power credits from a power credit pool. The power sensing circuit may be configured to monitor one or more characteristics of a power supply node coupled to the execute circuit to generate a power value, and to deposit a second amount of power credits into the power credit pool. The second amount of power credits may be based on the power value indicating that power consumed during the execution of the particular operation is less than the predicted power consumption.

In a further embodiment, the one or more characteristics may include voltage droop on the power supply node. The power sensing circuit may be further configured to determine the second amount of power credits based on an amount of monitored voltage droop during execution of the particular operation.

In an embodiment, the power sensing circuit may be further configured to suspend power credit deposits for a particular amount of time in response to a determination that a power supply overshoot event has occurred. In an example, to generate the power value, the power sensing circuit may be further configured to detect propagation of a signal transition through a series of logic gates.

In another example, to generate the power value, the power sensing circuit may be further configured to generate a sensor value that is indicative of a number of the series of logic gates through which the signal transition has propagated after a particular amount of time. In an embodiment, the execute circuit may include a particular number of stages. The particular amount of time may be based on the number of stages.

In another embodiment, the power estimator circuit may be further configured, based on the available amount of power credits in the power credit pool, to throttle a number of operations sent to the execution circuit over a particular amount of time. In an example, the predicted power consumption may be based on a worst-case power consumption for the particular operation.

BRIEF DESCRIPTION OF THE DRAWINGS

The following detailed description makes reference to the accompanying drawings, which are now briefly described.

FIG. 6 illustrates a flow diagram of an embodiment of a method for refunding power credits to an execute circuit.

Figure 1:
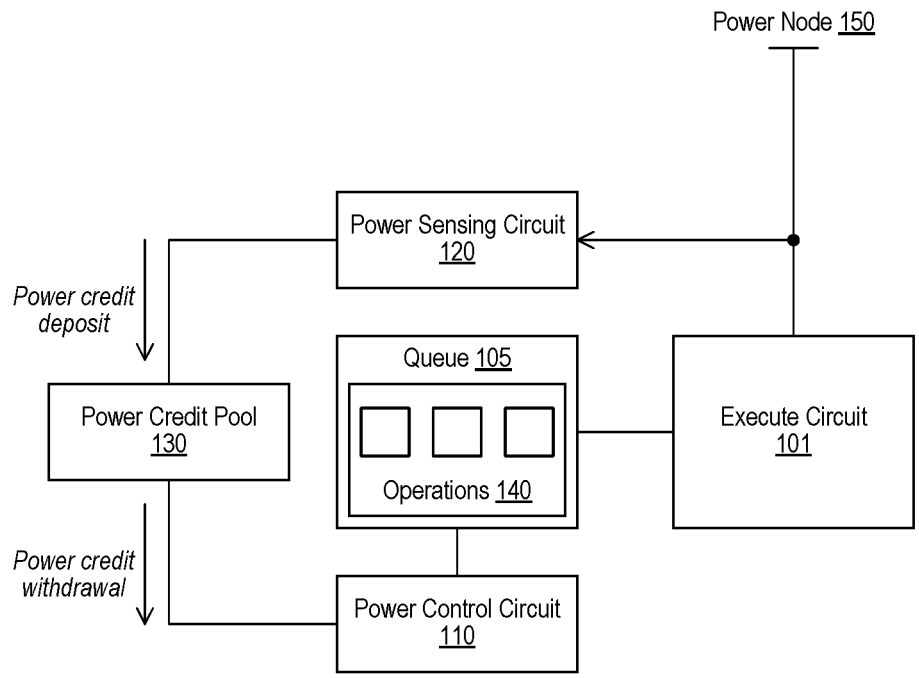
FIG. 1 illustrates a block diagram of an embodiment of a processor.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims.

DETAILED DESCRIPTION OF EMBODIMENTS

As described above, a plurality of execute circuits operating concurrently may consume an amount of power that exceeds the amount of power a power supply and/or power distribution circuits can provide. This excess power consumption may cause a power supply voltage level to droop, possibly resulting in an error if the voltage level drops below a safe operating level. Accordingly, some embodiments of integrated circuits include power management circuits that use a power credit mechanism to allot a particular amount of power to each of a plurality of execute circuits over a given amount of time. To issue an operation to an execute circuit, a particular number of power credits are deducted from the execute circuit's allotment. As long as the remaining power credits in the execute circuit's allotment is greater than a threshold number, the operation may be issued and the execute circuit is allowed to perform the issued operation. Otherwise, if the number of credits in the allotment falls below the threshold value, issue of the operation may be temporarily stalled.

Some integrated circuits may deduct a same number of credits, regardless of operations being performed by the execute circuit. Other integrated circuits, determine a number of power credits to deduct based on a type of operation being performed. In either case, a worst-case assumption may be made regarding how much power an operation is estimated to consume. Continuous use of worst-case assumptions may result in an unnecessary performance throttling if actual power consumption is not worst-case. Accordingly, this disclosure describes a technique that allows power credits to be refunded if actual power consumption during performance of operations is less than worst-case estimates.

Embodiments of apparatus and methods are presented in which a power estimator circuit is configured to withdraw power credits based on a predicted power consumption of an operation that is to be issued to an execute circuit. A power sensing circuit is configured to monitor characteristics of a power supply node, coupled to the execute circuit, to generate a power value. Based on the power value indicating that power consumed during the execution of the operation is less than the predicted power consumption, the power sensing circuit may refund a portion of the deducted power credits.

FIG. 1 illustrates a block diagram of one embodiment of a processor 100. In the illustrated embodiment, processor 100 includes execute circuit 101 configured to receive operations 140 from queue 105. Power control circuit 110 is coupled to queue 105 as well as to power credit pool 130. Power sensing circuit 120 is coupled to power node 150 that is used to provide power to execute circuit 101. In some embodiments, processor 100 is included in an integrated circuit (IC), such as a system-on-chip (SoC), as one of one or more processors in a processor complex.

As illustrated, execute circuit 101 is configured to execute a plurality of operations 140 received from queue 105. Execute circuit 101, in various embodiments, may perform any suitable type of operations, such as integer math instructions, Boolean logic instructions, flow control instructions, floating-point math instructions, and the like. Execute circuit 101 may include an execute pipeline that further includes any suitable number of stages for performing received operations. For example, execute circuit 101 may include one or more stages for executing a received operation, one stage for committing the operation and another for storing a result of the operation (e.g., a writeback stage). Any of the above stages may be implemented as two or more stages. In embodiments with multiple stages, execute circuit 101 may be capable of performing multiple operations concurrently, one operation per stage.

Operations 140, stored in queue 105, are issued to execute circuit 101 as execute circuit 101 completes previously issued operations, allowing execute circuit 101 to perform all or a portion of a program. Queue 105, in some embodiments, receives operations 140 using a fetch buffer or instruction cache that may either be included as part of queue 105 or coupled to queue 105. For example, queue 105 may be an instruction buffer configured to store decoded, ready-to-issue instructions for execute circuit 101 until execute circuit 101 has bandwidth to receive the instructions from queue 105.

As shown, power control circuit 110 is configured to predict power consumption due to execution of a particular operation of the plurality of operations 140, and then to withdraw, based on the predicted power consumption, a first amount of power credits from power credit pool 130. The predicted power consumption may be based on a worst-case power consumption for a particular operation. For example, evaluation or simulation data may be used to estimate power consumption of each operation of an instruction set supported by execute circuit 101. Worst-case power consumption estimates may be used to ensure that actual power consumption does not exceed the estimated power consumption.

Power credits are accumulated in power credit pool 130 over time, issued, for example, by a power management circuit that oversees power distribution to processor 100, as well as other circuits included in an IC on which processor 100 is implemented. While execute circuit 101 is idle or operating at a reduced capacity, power credit pool 130 may receive more credits allocated for execute circuit 101 than are deducted for performing ones of operations 140. Conversely, while execute circuit 101 is operating at or near full capacity, power credit pool 130 may have more power credits deducted for performing ones of operations 140 than are allocated. Power control circuit 110, based on an available amount of power credits in power credit pool 130, may throttle a number of operations 140 sent to execution circuit 101 over a particular amount of time. For example, a currently number of available power credits allocated to execute circuit 101 may be compared to a threshold number, and if the current number is below the threshold, issue of operations 140 to execute circuit 101 are throttled by allowing a single operation to be issued during a particular number of clock cycles of a system clock utilized by processor 100.

The use of worst-case power consumption estimates may result in more power credits being deducted than is necessary for the actual power usage. To mitigate the use of worst-case power estimates, power sensing circuit 120, as shown, is configured to monitor one or more characteristics of power node 150, which is coupled to execute circuit 101, and use the monitored characteristics to generate a power value. These one or more characteristics may include, for example, voltage droop on power node 150 and/or current through power node 150. Using the power value, power sensing circuit 120 determines a second amount of power credits to deposit back into power credit pool 130. This second amount of power credits may be based on the power value indicating that power consumed during the execution of the particular operation is less than the predicted power consumption. The second amount may be based on a size of the difference. For example, the second amount of power credits may be based on an amount of monitored voltage droop during execution of the particular operation as compared to a worst-case voltage droop that may be expected during execution of the particular operation. If the difference is below a threshold amount, then no deposit may be made. If the difference is greater than the threshold, then the second amount, which may be less than the first amount, is refunded to power credit pool to be used for performing a subsequent operation. In some embodiments, several thresholds may be used, such that the refunded amount of power credits is determined based on which threshold is satisfied. A larger difference between actual and estimated power consumption resulting in a larger number of power credits refunded.

By depositing power credits back into power credit pool 130, the number of available power credits for execute circuit may be increased when actual power consumption falls below a worst-case estimate. In contrast, when actual power consumption matches or is close to the worst-case estimates, then few if any power credits may be refunded, and the number of available power credits for execute circuit may reach a threshold number resulting in throttling of operations. Such a tracking of power credits may provide a more accurate measure of power consumption of execute circuit 101, allowing execute circuit 101 to operate at or near full bandwidth for a longer period of time before being throttled as compared to a power management system that does not support power credit refunds.

It is noted that processor 100 as illustrated in FIG. 1 is merely an example. The illustration of FIG. 1 has been simplified to highlight features relevant to this disclosure. Various embodiments may include different configurations of the circuit blocks, including additional functional blocks such as a fetch buffer, instruction cache, decode unit, rename circuitry, reorder buffer circuitry, scheduling circuitry such as reservation stations or a centralized scheduler, a clock source, and the like.

Figure 2:
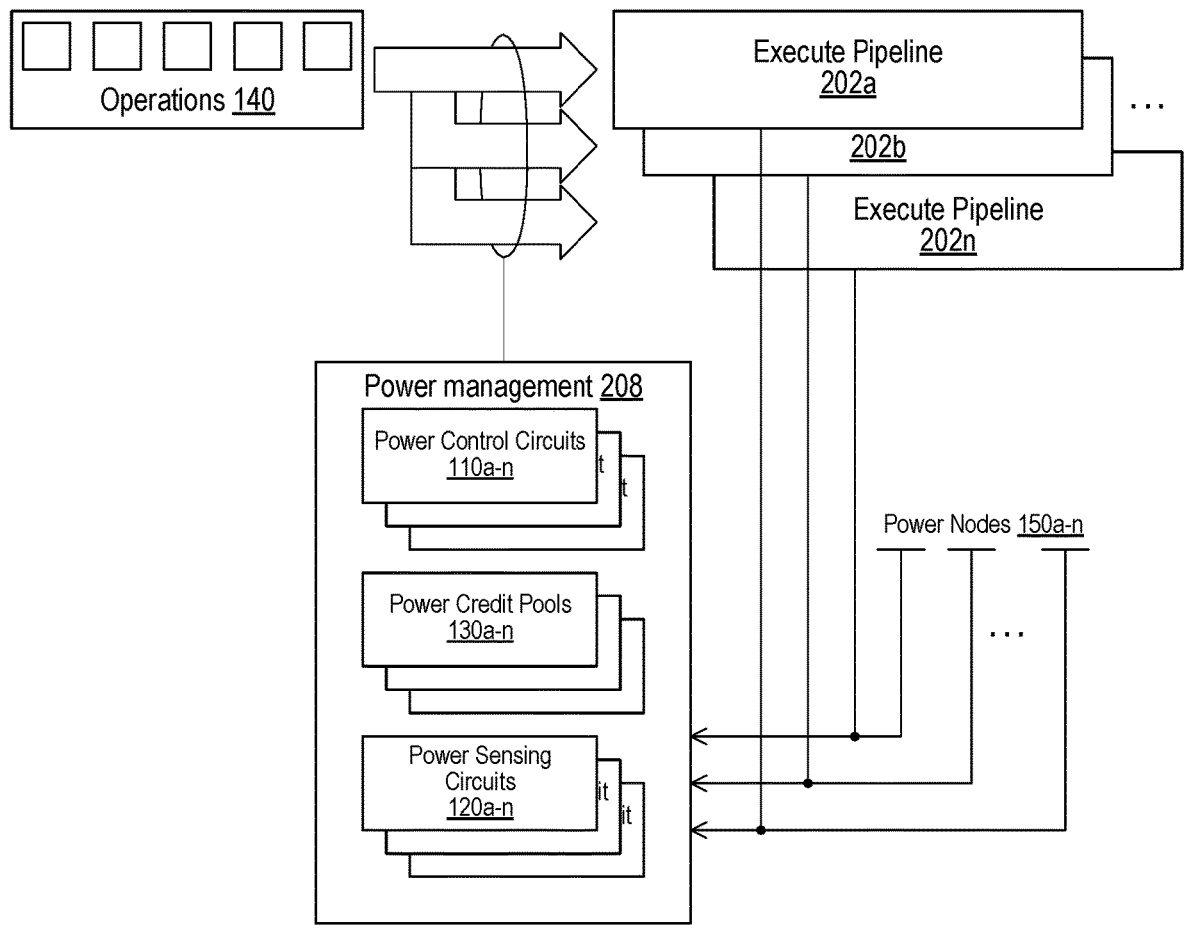
FIG. 2 shows a block diagram of an embodiment of a processor with a plurality of execute pipelines.

The processor illustrated in FIG. 1 includes a single execute circuit. In many processors, multiple execute circuits are included to either perform a particular function or set of functions, or to provide increased processing bandwidth compared to a single execute circuit. FIG. 2 includes a processor that utilizes a plurality of execute circuits.

Moving to FIG. 2, a block diagram of an embodiment of processor 100 is shown that includes multiple execute circuits. As illustrated, operations 140 are distributed among execute pipelines 202a-202n (collectively referred to as execute pipelines 202). Power management unit 208 includes multiple instances of power control circuits 110a-n (collectively power control circuits 110), power sensing circuits 120a-120n (collectively power sensing circuits 120), and power credit pools 130a-130n (collectively power credit pools 130).

As shown, processor 100 of FIG. 2 depicts how elements shown in FIG. 1 may be repeated, in an SoC for example, to increase a processing bandwidth of processor 100. By including multiple execute pipelines 202, operations 140 may be selectively assigned to a corresponding one execute pipeline 202, allowing for multiple operations 140 to be performed concurrently. As used herein, "concurrent" refers to performance of operations overlapping in time, and is not intended to imply that concurrent performance of operations must begin and/or end at a same time, although such occurrences are not excluded. Each of execute pipelines 202 may include a respective queue 105 and execute circuit 101 as described above in regards to FIG. 1. In various embodiments, each of execute pipelines 202 may be a same design, allowing concurrent performance of similar operations, may be different designs such that each pipeline performs a particular type of task (e.g., integer and logic functions, floating point operations, load/store operations, etc.), or a combination thereof. For example, execute pipelines 202a and 202b may process similar integer and logic operations while execute pipeline 202c (not shown) processes only integer divide operations, execute circuit 202d (not shown) processes floating point operations, and execute pipeline 202e (not shown) processes memory access operations.

While use of the plurality of execute pipelines 202 may improve a performance bandwidth of processor 100, an increase in a number of circuits active concurrently may result in an overload of a power supply, thereby causing a voltage droop. As used herein, "voltage droop" refers to a condition wherein an amount of power drawn from a power node reaches a limit of what a power supply can provide. Since power is limited, an increase in current draw from the node results in a corresponding decrease in a voltage level of the node, e.g., a voltage droop. In some cases, a power limit may be temporary as a power source adjusts to a sudden increase in demand, or may be permanent based on a maximum amount of power that can be provided by a design of the power source and the power distribution circuits that route power signals from the source to power nodes 150.

In addition, concurrent operation of execute pipelines 202 may increase an operating temperature of processor 100, of an IC that includes processor 100, and/or a computer system that includes the IC. Raised temperatures in an IC may impact performance of the IC in various ways. For example, an increase in temperature above a nominal operating temperature may result in increased propagation delays through circuits, thereby reducing a maximum safe operating frequency of the circuits. In addition, such an increase in temperature may reduce the power limit that the power supply can provide. At the same time, increased operating temperature may increase a minimum safe operating voltage level of the circuits.

Accordingly, IC designers may utilize the techniques described herein to avoid reaching maximum power limits and/or to avoid raising IC temperature beyond a safe operating threshold. As illustrated, power management unit 208 is included in processor 100 for various reasons, including to manage power credits for each of execute pipelines 202. Power management unit 208 may, as described above, utilize power control circuits 110 to monitor operations 140 that are ready to issue in respective ones of execute pipelines 202 and predict a power consumption value for each operation that is next in queue to be performed. Based on the predicted power consumption values, a respective number of power credits are deducted from a respective one of power credit pools 130. Power control circuits 110 may further throttle issuance of operations in a respective execute pipeline 202 if a corresponding number of available power credits does not satisfy a threshold number. Power sensing circuits 120 monitor respective ones of power nodes 150 as issued ones of operations 140 are performed in the respective execute pipeline 202. Power values are generated for each execute pipeline that is currently performing an operation and these power values are used to determine a difference between the predicted power consumption and actual power consumption for each operation that is performed. Power credits may be refunded to execute pipelines 202 based on the respective determined differences.

Using such a method to manage power credits for each execute pipeline in a processor may provide a desirable amount of control for each individual execute pipeline. Such a technique may allow for an increased level of accuracy for determining power consumption in the processor and allow execute pipelines that are not utilizing all of their allotted power credits to maintain a higher level of performance than other pipelines that reach their allotted power consumption and are throttled as a result. Without use of such a technique, the execute pipelines may be throttled in combination, resulting in some pipelines that aren't utilizing their full bandwidth being unnecessarily throttled.

It is noted that the embodiment of FIG. 2 is one example. In other embodiments, a different combination of elements may be included. For example, the illustrated embodiment includes respective power control circuits, power sensing circuits, and power credit pools for each execute pipeline. In other embodiments, one or more of these circuits may be designed to support more than one respective execute pipeline.

Figure 3:
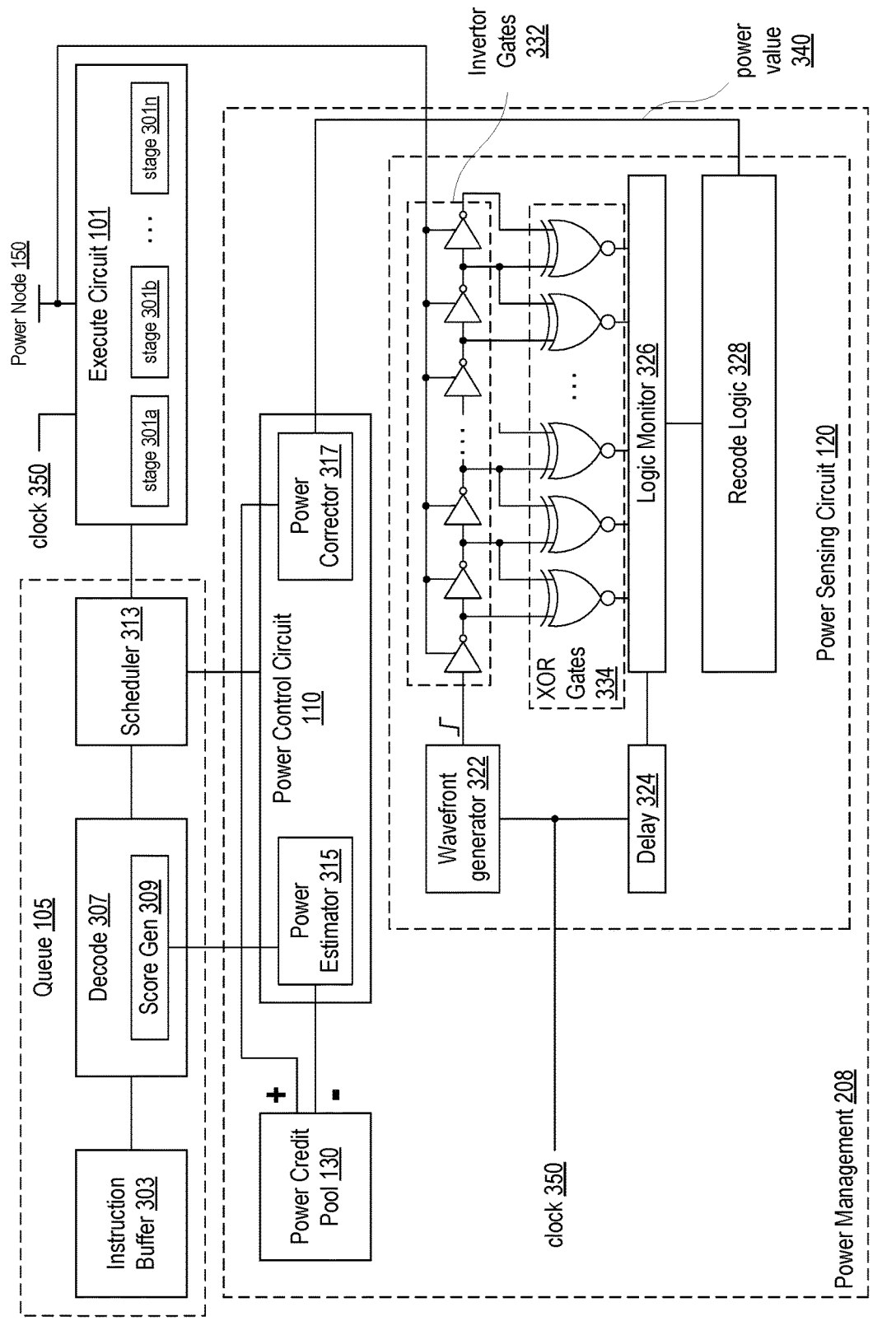
FIG. 3 depicts another block diagram of an embodiment of the processor in FIG. 1.

FIGS. 1 and 2 depict two embodiments of a processor that supports power credit refunds. Some details of the elements of the processor were omitted to highlight the disclosed concepts. Such details may be implemented in various embodiments using a range of designs. FIG. 3 illustrates details of one such design.

Turning to FIG. 3, a block diagram of another embodiment of a processor is depicted, including details of a power sensing circuit. Processor 100 includes several previously disclosed elements including execute circuit 101, queue 105 power control circuit 110, power sensing circuit 120, and power credit pool 130. Some additional details are shown for several of these elements, including stages 301a-301n in execute circuit 101 (collectively stages 301), instruction buffer 303, decode 307, and scheduler 313 in queue 105, and power estimator 315 and power corrector 317 in power control circuit 110. Details of power sensing circuit 120 are also depicted, including wavefront generator 322, delay circuit 324, logic monitor 326, recode logic 328, invertor gates 332, and XOR gates 334.

As illustrated, execute circuit 101 includes stages 301, each of which may process a portion of an operation at a given time. An operation to be performed begins in stage 301a and completes in stage 301n. Any suitable number of stages may be included in various embodiments. Stages 301 may include one or more execution stages as well as a commit stage and a writeback stage.

Queue 105, as shown, includes instruction buffer 303, decode 307, and scheduler 313. Operations to be performed by execute circuit 101 are received in instruction buffer 303, and then decoded in decode 307. Decode 307 is configured to extract an op code and one or more operands from a given operation, to ready the operation for issue to execute circuit 101. Scheduler 313, in response to determining that stage 301a is available to receive a new operation, schedules a next ready-to-issue, decoded operation to be performed in execute circuit 101.

In addition, decode 307 includes score generator (score gen) 309 that is configured to generate a power consumption score for a decoded operation. This power consumption score is then used by power control circuit 110 to determine a power consumption estimate for the corresponding operation that may then be used to deduct power credits from power credit pool 130. In response to determining that an available number of power credits associated with execute circuit 101 fails to satisfy a threshold number, power control circuit 110 may further cause scheduler 313 to reduce a number of operations scheduled over a period of time. This reduction in the number of operations scheduled may reduce activity in execute circuit 101, thereby reducing power consumption and heat generation. The reduced rate of scheduling may also provide time for execute circuit 101 to acquire more power credits than are deducted, allowing the number of available power credits to eventually satisfy the threshold number.

Power control circuit 110 includes power estimator 315 and power corrector 317. Power estimator 315 receives the power consumption estimate from score generator 309 and uses this estimate to determine a number of power credits to deduct from power credit pool 130 for a given operation. The power consumption estimate may be maintained until the corresponding operation has been committed and an actual power consumption value has been generated and compared to the estimated value.

Power corrector 317 receives power value 340 from power sensing circuit 120. Power value 340 provides an indication of the actual power consumption of the corresponding operation as it is performed by execute circuit 101. Power corrector 317 uses power value 340 and the maintained power consumption estimate to determine a difference between the estimated and actual power consumption of the corresponding operation. Based on this difference, power corrector 317 may refund some number of power credits to power credit pool 130. In a manner as described above, power corrector 317 may utilize one or more threshold numbers to determine how many power credits to refund. For example, if three threshold values are used, then no power credits may be refunded if no threshold numbers are satisfied, a small portion (e.g. 10%) refunded if the first threshold is satisfied, a medium portion (e.g. 20%) refunded if the second threshold is satisfied, and a large portion (e.g., 30%) refunded if the third threshold is satisfied. It is noted that these percentages are merely an example and any suitable amount of power credits may be refunded for each threshold. In other embodiments, rather than thresholds, an amount of credits to refund may be determined based on a calculation using the determined difference, or using a lookup table based on the determined difference.

To generate power value 340, power sensing circuit 120 monitors a voltage level of power node 150. Power sensing circuit 120, as shown, includes a series of invertor circuits (invertor gates 332) configured to delay propagation of a signal transition at the input of an initial invertor circuit of invertor gates 332. An amount of delay time through a particular invertor circuit of invertor gates 332 is based on a voltage level of power node 150 that supplies power to execute circuit 101. As shown, this is accomplished by powering each of invertor gates 332 from power node 150. Each of invertor gates 332 are configured to increase the propagation delay in response to a decrease in the voltage level of power node 150. Wavefront generator 322 generates the signal transition on the input of the initial invertor circuit of invertor gates 332 using clock signal 350. Each inverter circuit of invertor gates 332 is configured to generate a logic output state that is opposite of the input logic state. Accordingly, when all signals of invertor gates 332 are stable, the output of each invertor circuit is the opposite of the output of the preceding invertor circuit. When wavefront generator 322 causes the signal transition, two consecutive invertor circuits of invertor gates 332 will have a same output value for a brief moment in time as the signal transition propagates through all of invertor gates 332. By observing the outputs of invertor gates 332 at a particular amount of time after the signal transition is generated by wavefront generator 322, a voltage level of power node 150 may be determined based on how far the signal transition has propagated through invertor gates 332.

Logic monitor 326 is configured to detect the logic states (e.g., logic levels) at the outputs of the series of invertor gates 332. Logic monitor 326 utilizes XOR gates 334 to compare outputs of each consecutive pair of invertor gates 332. Each of XOR gates 334 will generate a logic high state as long as the outputs of the two respective invertor gates 332 have opposite states. Where two consecutive invertor gates 332 have the same state, indicating the propagation point of the signal transition, the output of the corresponding XOR gate 334 will be a logic low state. Logic monitor 326 captures the outputs of XOR gates 334 in response to a capture signal from delay circuit 324. Delay circuit 324 generates the capture signal a number of clock cycles after wavefront generator 322 generates the signal transition. These clock cycles are based on clock signal 350, which is also used by execute circuit 101. The number of cycles, in some embodiments, is less than the complete propagation delay through the inverter gates 332, so that a transition may be visible in the capture output showing the average delay over the number of clock cycles. The measured delay would be affected by the voltage droop experience over the number of clock cycles, for example.

Assume, for example, there are five stages 301. Wavefront generator 322 may generate the signal transition at a same time that a particular operation begins execution in stage 301a. If operations progress through stages 301 on each cycle of clock signal 350, then delay circuit 324 may be configured to assert the capture signal after five cycles of clock signal 350. Thus, an output captured in logic monitor 326 may correspond to an average voltage level of power node 150 during the execution of the particular operation. In other embodiments, logic monitor 326 may capture the outputs every clock cycle.

Recode logic 328 retrieves the captured outputs from logic monitor 326 and generates power value 340. For example, recode logic 328 may generate power value 340 by setting power value 340 to a value that indicates which XOR gate of XOR gates 334 has a logic low state that indicates propagation of the signal transition. In other embodiments, recode logic 328 may normalize power value 340 to indicate a number of XOR gates before or after a nominal number of XOR gates 334 that the propagation has reached, where the nominal number of XOR gates is determined based on the voltage level of power node 150 being at an expected target voltage level. Recode logic may determine power value 340 to represent power consumption over any particular number of cycles of clock signal 350. In some embodiments, recode logic 328 may generate a new power value 340 every cycle of clock signal 350, with each new value representing power consumed over the previous particular number of cycles. For example, recode logic 328 may generate power values 340 such that each power value 340 corresponds to power consumed over the previous five cycles of clock signal 350.

In various embodiments, recode logic 328 may modify power value 340 in one or more ways. For example, different operations may utilize or skip particular ones of stages 301. Accordingly, some operations may be completed in fewer than the example five cycles. Moreover, some operations may remain in a particular stage for longer than a single clock cycle, and therefore, require more than the example five clock cycles to complete. Recode logic may weight a power value 340 that corresponds to such an operation accordingly, increasing a power value 340 for an operation that takes more cycles (thereby consuming more power) and decreasing a power value 340 for an operation that takes fewer cycles (and thereby consuming less power).

In addition, recode logic 328 may modify power value 340 based on a current operating temperature of the IC on which processor 100 is implemented. As an operating temperature increases, it may be desirable to refund fewer credits, resulting in an active execute circuit 101 consuming power credits faster and reaching a threshold to enable of throttling more quickly. Recode logic 328 may, therefore, weight power value 340 according to a current operating temperature.

In some embodiments, processor 100 may be one of multiple circuits included on an IC. These other circuits may be consuming power at a same time that execute circuit 101 is active. Although power node 150 may be physically close to execute circuit 101, the other circuits may be drawing power from a same power source to which power node 150 is coupled. Activity on these other circuits may cause voltage level fluctuations on power node 150 that are not directly attributable to execute circuit 101. Accordingly, recode logic 328 may receive indications of activity of these other circuits and weight power value 340 to compensate for potential voltage level fluctuations not caused by execute circuit 101.

As illustrated, power control circuit 110 is configured to determine a number of power credits to refund to power credit pool 130. Power corrector 317 receives, from recode logic 328, respective power values 340 at a plurality of points in time. Using the respective power values 340, determine a difference between power consumption estimates generated by power estimator 315 and actual power consumption of execute circuit 101. For each determined difference, an amount of power credits are refunded for use by execute circuit 101. Control circuit may be further configured to determine the amount of power credits to refund by comparing each determined difference to one or more threshold values, as has been disclosed above.

It is noted that the processor of FIG. 3 is an example. Variations of the disclosed embodiment are contemplated. For example, in some embodiments, the invertor gates and/or XOR gates may be replaced with other types of logic circuits, such as asynchronous latches. To modify the power value, recode logic 328 is described as decreasing the power value to indicate less power consumed and increasing the power value to indicate more power being consumed. In other embodiments, the logic may reversed such that lower power values indicate higher power consumption, and vice versa.

In FIG. 3, a power sensing circuit is described for determining an indication of a voltage level of a power node. To further demonstrate operation of such a power sensing circuit, an example waveform of a voltage level of a power node is depicted, along with possible values associated with the power sensing circuit corresponding to different points on the waveform.

Figure 4:
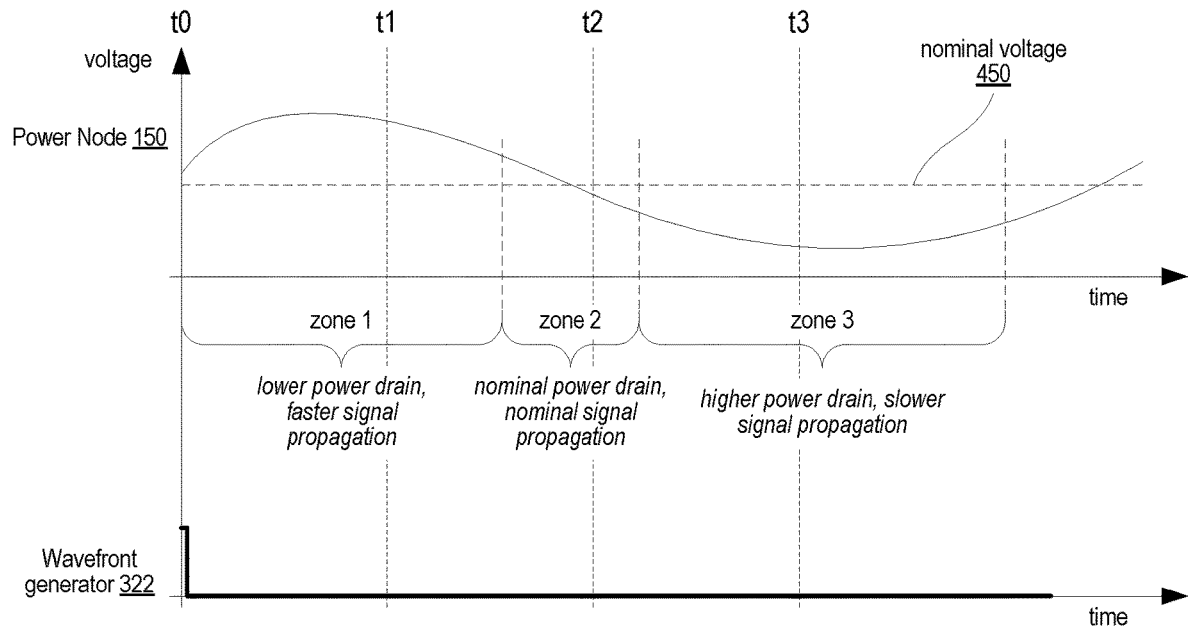
FIG. 4 illustrates a chart of a voltage level of a power node of an execute circuit as well as four tables depicting values associated with a power sensing circuit.

Proceeding to FIG. 4, a chart depicting a waveform of a voltage level of a power node and a signal from a wavefront generator is shown. Chart 400 shows a representation of a voltage level of power node 150 (of FIGS. 1-3) and a voltage level of an output of wavefront generator 322 (of FIG. 3) versus time. A dashed line indicates nominal voltage level 450 corresponding to an expected voltage level of power node 150. In addition, values for outputs of invertor gates 332 and XOR gates 334 (of FIG. 3) are shown for several points in time highlighted on chart 400. It is noted that seventeen invertor outputs 432 are shown, corresponding to sixteen XOR outputs 434. A respective power value 340 is also shown with a value based on each of the depicted XOR outputs 434. Referring collectively to FIG. 3 and chart 400, the illustrated waveform begins at time t0.

As illustrated, the voltage level of power node 150 at time t0 is near nominal voltage level 450. As shown by invertor outputs 432a, invertor gates 332 do not indicate propagation of a signal transition, resulting in XOR outputs 434a being all logic high states. Wavefront generator 322, at time t0, initiates a signal transition on the input of the initial invertor circuit of invertor gates 332. This signal transition propagates through invertor gates 332 from time t0 through time t3 and beyond, until the transition propagates to the last gate of invertor gates 332. It is noted that, as illustrated, invertor outputs 432a-432d and XOR outputs 434a-434d are arranged such that a first gate in the series of invertor gates 332 and XOR gates 334 correspond to the left-most bit of invertor outputs 432 and XOR outputs 434, respectively, and a last gate in each series corresponds to the right-most bit.

At time t1, logic monitor 326 captures the output states of XOR gates 334 which are determined by the output states of invertor gates 332. As shown at time t1, invertor outputs 432b have consecutive logic high states towards the left of center, indicating that the signal transition has propagated though the first four invertor gates 332, but has not yet caused the fifth invertor gate 332 to transition. In chart 400, time t1 occurs in what is labeled as zone 1, where the voltage level of power node 150 is greater than nominal voltage level 450, resulting in invertor gates 332 having lower propagation delays. With lower propagation delays, the signal transition propagates more rapidly during the t0 to t1 time frame. The fourth output of XOR outputs 434b indicates, with a logic low state, that the signal transition has reached the fourth gate of invertor gates 332.

At time t2, the voltage level of power node 150 is in zone 2. In zone 2, the delay times of invertor gates 332 are at a nominal level. As shown by invertor outputs 432c, propagation of the signal transition continues through three additional invertor gates 332. The seventh XOR output of XOR outputs 434c is a logic low state, indicating, with a logic low state, that the signal transition has reached the seventh gate of invertor gates 332.

At time t3, the voltage level of power node 150 is in zone 3. Zone 3 corresponds to delay times of invertor gates 332 that are slower than the nominal level. As shown by invertor outputs 432d, the propagation of the signal transition does not travel as far as during time periods t0 to t1 and t1 to t2. From time period t2 to t3, the signal transition, as indicated by invertor outputs 432d, propagates only one additional invertor gate. The eight XOR output of XOR outputs 434c is a logic low state, indicating, with a logic low state, that the signal transition has reached the seventh gate of invertor gates 332.

A power value 340 may be generated to represent the amount of power consumed from time t0 to time t3. As illustrated, power value 340 indicates the number of invertor gates 332 that the signal transition has propagated through during the time frame, e.g., eight. In such embodiments, a higher power value may indicate less power consumed, as the more invertor gates the transition propagates through, the higher the voltage of power node 150, therefore, indicating less power consumed. In other embodiments, the power value may be normalized to a nominal value. For example, for the seventeen invertor outputs 432 shown, power values may be normalized such that reaching the ninth invertor gate 332 corresponds to a power value of zero. When power consumption is high and the ninth invertor gate is not reached, '1' is added for each invertor gate that the signal transition fell short, and for each invertor gate the transition passes beyond the ninth gate, '1' is subtracted. For example, reaching only the fifth gate would result in a power value of four, while reaching the fourteenth gate would result in a power value of negative five. Various other methods for generating a power value are contemplated.

It is noted, that as shown, XOR outputs 434 are captured at particular amounts of time after a signal transition is initiated by wavefront generator 322. The particular amounts of time may be established by a circuit designer based on, for example, a particular number of clock cycles, such as cycles of clock signal 350 in FIG. 3. The amount of time may be fixed or programmable in various embodiments. In some embodiments, as is discussed below, the amount of time may be based on a number of stages of an execute circuit.

By using the disclosed techniques, a power value may be generated that is indicative of an amount of voltage droop, or overshoot, occurring on a monitored power node during execution of a particular operation. As illustrated, the power values (two, seven, and eleven) are generated such that lower values of the power value correspond to higher voltage levels, and therefore less power consumption. Other conventions may be used such that the opposite is true, lower power values correspond to higher power consumption, and vice versa.

As used herein, "voltage overshoot" or simply "overshoot," refers to a voltage level of a power supply signal rising above a desired, target voltage level. Overshoot may occur when power being drawn from a power source is less than what the power source is generating. In a regulated power supply domain, a voltage converter circuit may have a delayed reaction to sudden changes in power demand. If a circuit drawing a large amount of power shuts off quickly, the voltage converter circuit may not react until the voltage level of the generated power supply signal reaches a particular voltage level. The correction to reduce power output may require some time, resulting in the voltage level of the power supply signal remaining in an overshoot condition until the voltage converter circuit adjusts its output or circuits powered by the power supply signal increase their consumption.

The voltage overshoot shown in zone 1 may, in some cases, be caused by an operation consuming less power than is being provided. In other cases, however, this voltage overshoot may be caused by a change in power demand by other circuits in the IC unrelated to operation of execute circuit 101. In these other cases, the overshoot may mask actual power consumption of operations that are performed during a voltage overshoot condition. As a mitigation, in some embodiments, power sensing circuit 120 and/or power control circuit 110 are further configured to suspend power credit deposits for a particular amount of time in response to a determination that a power supply overshoot event has occurred. Otherwise, power credit pool 130 could acquire more credits for execute circuit 101 than are deserved, allowing execute circuit 101 to operate in an unthrottled condition for longer than is desired. Such unthrottled operation could, in some embodiments, result in elevated operating temperatures which could lead to improper operation of execute circuit 101 or other nearby circuits that are susceptible to high temperatures.

It is noted that the example of FIG. 4 is merely for demonstrating the disclosed concepts. In other embodiments, the waveform depicting the voltage level of power node 150 may have a different appearance due to noise coupled from operation of other circuits on a same IC, temperature levels of the IC, and the like. In other embodiments, the number of invertor outputs and XOR outputs may differ. Although seventeen invertors are shown, other embodiments may include a different number, such as 200 or more.

Figure 5:
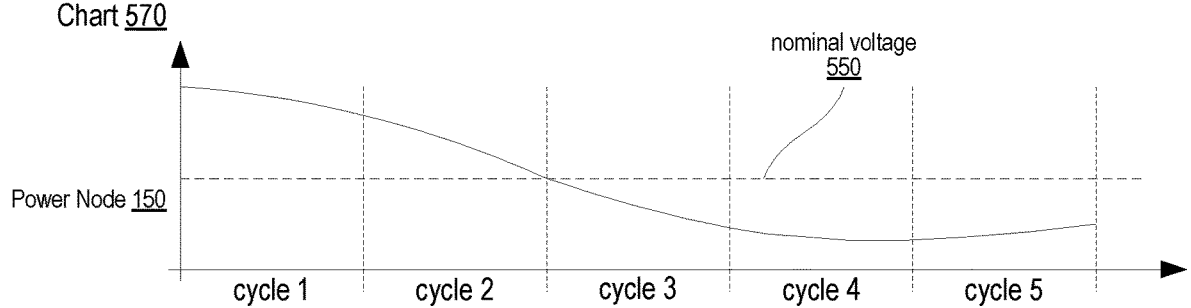
FIG. 5 shows another chart of a voltage level of a power node of an execute circuit as well as a table depicting a flow of operations through the execute circuit.

FIG. 4 shows a waveform depicting a voltage level of a power node and generation of a power value to indicate voltage of the waveform. The generated power values are synchronized to execution of operations in a multi-stage execute circuit. FIG. 5 illustrates an example of synchronizing the generation of power values to execution of particular operations.

Moving now to FIG. 5, a table depicting operations progressing through stages of an execute circuit is illustrated. Table 500 shows operations (oper) 551-559 progressing through stages 301a-301e (collectively 301) in execute circuit 101 over the course of five clock cycles (e.g. clock signal 350 in FIG. 3). FIG. 5 further includes chart 570 depicting a voltage level of power node 150 during the same five cycles, as well as power values 540a-540e (collectively 540) corresponding to each of the five cycles.

As illustrated, operations 551-559 progress through execute circuit one stage at a time, with a subsequent operation entering earlier stages as processing operations move to a later stage. Stage 301*a* corresponds to an initial stage of execute circuit 101 while stage 301*e* is a final stage before processing is complete. While FIG. 5 shows each operation progressing to a later stage at each cycle, in other embodiments, operations may progress at other rates, such as one stage per four cycles. In some embodiments, certain types of instructions may progress at different rates. For example, a memory read instruction may take a different number of cycles depending on availability of a memory circuit. For simplicity, however, operations 551-559 are shown progressing one stage per cycle.

Over the five illustrated cycles, operation 555 is shown beginning at stage 301*a* and completing at stage 301*e*, with four preceding operation 551-554, and four subsequent operations 556-559. In cycle 1, operation 555 begins in stage 301*a* while operation 551 completes in stage 301*e*. In cycle 2, operation 555 progresses to stage 301*b*, operation 552 completes in stage 301*e*, and operation 556 begins in stage 301*a*. This activity repeats through cycle 5 at which time operation 555 completes in stage 301*e*, while operation 559 begins in stage 301*a*.

Power sensing circuit 120 synchronizes generated power values 540 to corresponding operations. As shown, power value 540*a*, generated in cycle 1, corresponds to operation 551; power value 540*b*, generated in cycle 2, corresponds to operation 552; and so on to power value 540*e*, generated in cycle 5, corresponding to operation 555. Since execute circuit 101 includes a particular number of stages 301, power sensing circuit 120 synchronizes power values 540 using a particular amount of time based on the number of stages 301.

In some embodiments, power sensing circuit 120 is configured determine a power value 540 at a plurality of points in time using a count of cycles of a clock signal, wherein the clock signal is used by the execute circuit for performing operations. For example, as shown, power sensing circuit 120 generates a power value 540 in each of the five illustrated cycles. As described above, each power value 540 may represent power consumption over a particular number of previous cycles, in the illustrated example, five to correspond to the five stages of execute circuit 101. In various embodiments, power value 540*e* may, for example, represent power consumption during cycles 1-5 or during cycles 1-4 plus the cycle prior to cycle 1.

As shown in FIG. 5, power values 540 are generated such that voltage levels of power node 150 above nominal voltage level 550 result in negative power values to indicate less power used, while voltage levels below nominal voltage level 550 result in positive power values. Accordingly, operation 551, associated with power value 540*a*, uses less power that operation 555, associated with power value 540*e*. It is noted however, that power credit refunds are based on expected power used versus actual power used. For example, if an expected power value for operation 555 is four, then the actual value of two may result in a power credit refund.

It is noted that table 500 and chart 570 of FIG. 5 are examples. In other embodiments, execute circuit 101 may include a different number of stages. Although each operation is shown to progress to a next stage on each cycle, in other embodiments, a given operation may take more than one cycle to complete one or more of the stages. In some embodiments, execute circuit 101 may process only one operation at a time, such that a second operation is not accepted until a first operation completes the final stage.

The processors described above in regards to FIGS. 1-5 may perform power credit management techniques using a variety of methods. One such method is described in FIG. 6.

Turning now to FIG. 6, a flow diagram for an embodiment of a method for managing, by a power management circuit, power credits in a processor is shown. Method 600 may be performed by a power management circuit such as power management unit 208 in FIGS. 2 and 3, as well as power control circuit and power sensing circuit of FIG. 1. Referring collectively to FIGS. 3 and 6, method 600 begins in block 610.

At block 610, method 600 includes estimating, by a power management circuit, consumption of an execute circuit using a particular operation of a plurality of operations to be executed by the execute circuit. Power estimator 315 may estimate power consumption based on a type of operation, e.g., a read operation, write operation, integer operation, and the like. As shown in FIG. 3, decode 307 may include score generator 309 to generate a power consumption score for a decoded operation. This power consumption score may then be used by power estimator 315 to determine a power consumption estimate for the corresponding operation. In some embodiments, a type of operand and/or addressing mode included with the operation may also be used to estimate power. For example, an addition operation between two processor registers may be expected to use less power than an addition operation between one processor register and an operand fetched from a system memory location.

Method 600, at block 620, includes withdrawing, by the power management circuit based on the estimated power consumption, a first amount of power credits from a power credit pool. Based on the power consumption estimate, power estimator 315 deducts a number of power credits from power credit pool 130. Power control circuit 110 maintains the power consumption estimate along with a reference to the corresponding operation. If a number of remaining power credits associated with execute circuit 101 does not satisfy a threshold number, then power control circuit 110 may cause scheduler 313 to reduce a rate of issuing operations to execute circuit 101, thereby slowing execute circuit 101 and potentially reducing a rate of power consumption of execute circuit 101.

Method 600 also includes, at block 630, during execution of the particular operation, generating, by the power management circuit, a power value by monitoring one or more characteristics of a power supply node coupled to the execute circuit. As illustrated, the one or more characteristics may include voltage droop on the power supply node. Power sensing circuit 120 is used to monitor a voltage level of power node 150. A reduction of the voltage level of power node 150 below a nominal operating level may indicate voltage droop, which in turn, is indicative of a sudden increase in power consumption, such as may be caused by a current operation being performed by execute circuit 101.

As shown, generating the power value, comprises determining a number of a series of logic gates (e.g., invertor gates 332) through which a signal transition has propagated within a particular amount of time. Determining this amount of time may include using a count of cycles of a clock signal (e.g., clock signal 350) used by execute circuit 101. As described above, power sensing circuit 120 may generate power value 340 to represent an amount of voltage droop, and hence power consumption, occurring during one or more previous clock cycles. In some embodiments, the number of cycles represented by power value 340 may be based on a number of stage 301 included in execution circuit 101.

As previously disclosed, in some embodiments, power management unit 208, may modify the power value based on a determined operating temperature, activity of other nearby circuits on a same IC, a number of stages 301 the particular operation is expected to utilize, and/or other similar characteristics that may affect power consumption of the particular operation. For example, the particular operation may be recognized to utilize only three of five stages 301. If power values 340 are generated to represent five prior cycles, then an associated power value 340 would include power consumption during two cycles during which the particular operation was not active. Accordingly, the power value may be modified to indicate less power used during execution of the particular operation. Similarly, for an operation that is recognized as repeating one or more of the stages, thereby using more than five cycles to complete, the associated power value 340 may be modified to indicate increased power usage.

At block 640, method 600 further includes, based on a comparison of the estimated power consumption and the power value, refunding, by the power management circuit, a second amount of power credits to the power credit pool. As illustrated, power corrector 317 receives power values 340 from power sensing circuit 120. A received power value 340 corresponding to the particular operation is compared against a maintained power consumption estimate that also corresponds to the particular operation. A difference between these two values is used to determine if a power credit refund should be made, and if so, how many power credits should be refunded. As disclosed, determining the second amount of power credits to refund may be based on an amount of monitored power droop during execution of the particular operation. For example, the particular operation may be expected to cause 50 millivolts (mV) of voltage droop during execution, but the corresponding power value 340 may indicate only 20 mV of voltage droop. The 30 mV difference between the expected and actual voltage droops may then be used to determine a number of power credits to refund.

In some embodiments, credits may be refunded proportionate to the difference. For example, the 30 mV difference may be divided by the 50 mV expectation and three-fifths of the number of power credits that were withdrawn in block 620 are refunded. In other embodiments, the 30 mV difference may be compared to one or more threshold values and a fixed number of power credits may be refunded based on which threshold values are satisfied. It is noted that in some embodiments, power credits may be withdrawn and/or refunded using portions of a credit rather than whole integer values.

In some embodiments, power credit refunds may be suspended for a particular amount of time in response to a determination that a power supply overshoot event has occurred. For example, if a number of power values 340 in a row all indicate overvoltage rather than voltage droop on power node 150, then power management unit 208 may determine that a voltage overshoot has occurred and suspend power credit refunds for a period of time. The period of time may be based on continued monitoring, by power sensing circuit 120, of the voltage level of power node 150 and power credit refunds enabled once the voltage level returns to a nominal level. In other embodiments, the suspension may be performed for a fixed amount of time based on characteristics of a power supply circuit that provides power to power node 150. Method 600 may continue to repeat as long as operations remain in queue 105, or until a disable signal is received by processor 100.

It is noted that the method of FIG. 6 is merely an example for managing power credits in an execute circuit in a processor. As disclosed above, method 600 may be performed by respective elements in FIGS. 1-3. Variations of the disclosed methods are contemplated. For example, an execution throttling operation may be added after withdrawing the first amount of power credits in block 620.

Figure 7:
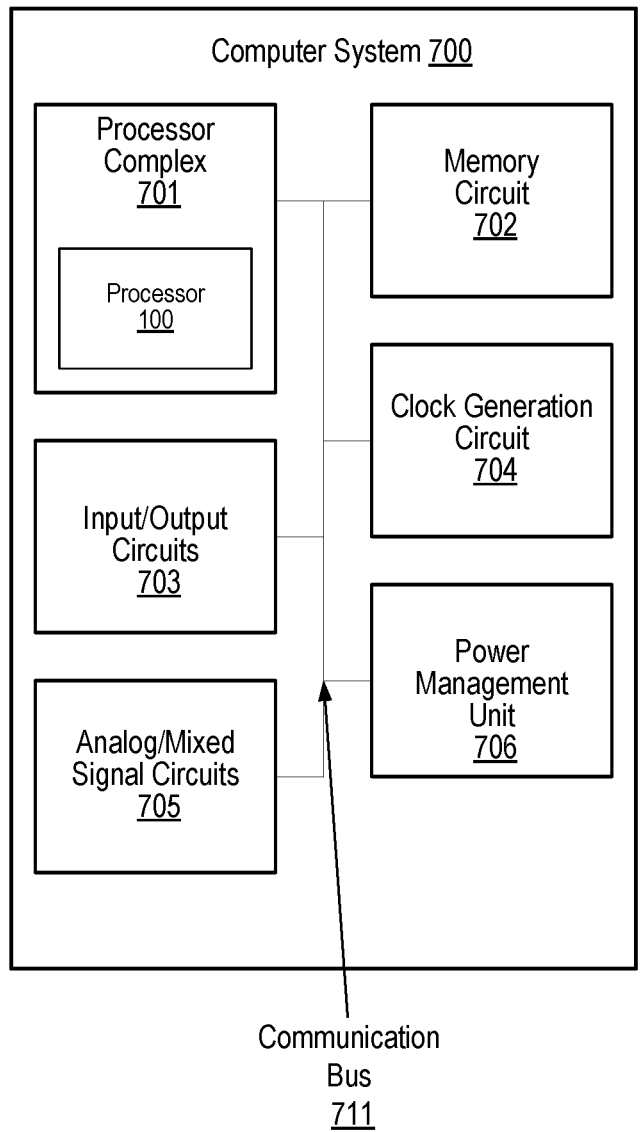
FIG. 7 depicts a block diagram of an embodiment of a computer system including the processor of FIG. 1.

FIGS. 1-6 illustrate apparatus and methods for a processor 100 that supports the disclosed power credit management techniques. Any disclosed embodiment of processor 100 may be included in one or more of a variety of computer systems, such as a desktop computer, laptop computer, smartphone, tablet, wearable device, and the like. In some embodiments, the circuits described above may be implemented on a system-on-chip (SoC) or other type of integrated circuit. A block diagram illustrating an embodiment of computer system 700 is illustrated in FIG. 7. Computer system 700 may, in some embodiments, correspond to any disclosed embodiment of processor 100.

As shown, computer system 700 includes processor complex 701, memory circuit 702, input/output circuits 703, clock generation circuit 704, analog/mixed-signal circuits 705, and power management unit 706. These functional circuits are coupled to each other by communication bus 711. As shown, processor complex 701 includes an embodiment of processor 100. In some embodiments, power management unit 706 may include some or all portions of power management circuits included in processor 100, e.g., power sensing circuit 120.

Processor complex 701, in various embodiments, may be representative of a general-purpose processor that performs computational operations. For example, processor complex 701 may be a central processing unit (CPU) such as a microprocessor, a microcontroller, an application-specific integrated circuit (ASIC), or a field-programmable gate array (FPGA). In some embodiments, processor complex 701 may correspond to a special purpose processing core, such as a graphics processor, audio processor, or neural processor, while in other embodiments, processor complex 701 may correspond to a general-purpose processor configured and/or programmed to perform one such function. Processor complex 701, in some embodiments, may include a plurality of general and/or special purpose processor cores as well as supporting circuits for managing, e.g., power signals, clock signals, and memory requests. In addition, processor complex 701 may include one or more levels of cache memory to fulfill memory requests issued by included processor cores. Processor 100 may correspond to any one or more processor cores included in processor complex 701, including, for example, general-purpose cores, ASIC cores, or special purpose cores.

Memory circuit 702, in the illustrated embodiment, includes one or more memory circuits for storing instructions and data to be utilized within computer system 700 by processor complex 701. In various embodiments, memory circuit 702 may include any suitable type of memory such as a dynamic random-access memory (DRAM), a static random access memory (SRAM), a read-only memory (ROM), electrically erasable programmable read-only memory (EEPROM), or a non-volatile memory, for example. It is noted that in the embodiment of computer system 700, a single memory circuit is depicted. In other embodiments, any suitable number of memory circuits may be employed. In some embodiments, memory circuit 702 may include a memory controller circuit as well communication circuits for accessing memory circuits external to computer system 700.

Input/output circuits 703 may be configured to coordinate data transfer between computer system 700 and one or more peripheral devices. Such peripheral devices may include, without limitation, storage devices (e.g., magnetic or optical media-based storage devices including hard drives, tape drives, CD drives, DVD drives, etc.), audio processing subsystems, or any other suitable type of peripheral devices. In some embodiments, input/output circuits 703 may be configured to implement a version of Universal Serial Bus (USB) protocol or IEEE 1394 (Firewire®) protocol.

Input/output circuits 703 may also be configured to coordinate data transfer between computer system 700 and one or more devices (e.g., other computing systems or integrated circuits) coupled to computer system 700 via a network. In one embodiment, input/output circuits 703 may be configured to perform the data processing necessary to implement an Ethernet (IEEE 802.3) networking standard such as Gigabit Ethernet or 10-Gigabit Ethernet, for example, although it is contemplated that any suitable networking standard may be implemented.

Clock generation circuit 704 may be configured to enable, configure and manage outputs of one or more clock sources. In various embodiments, the clock sources may be located in analog/mixed-signal circuits 705, within clock generation circuit 704, in other blocks with computer system 700, or come from a source external to computer system 700, coupled through one or more I/O pins. In some embodiments, clock generation circuit 704 may be capable of enabling and disabling (e.g., gating) a selected clock source before it is distributed throughout computer system 700. Clock generation circuit 704 may include registers for selecting an output frequency of a phase-locked loop (PLL), delay-locked loop (DLL), frequency-locked loop (FLL), or other type of circuits capable of adjusting a frequency, duty cycle, or other properties of a clock or timing signal.

Analog/mixed-signal circuits 705 may include a variety of circuits including, for example, a crystal oscillator, PLL or FLL, and a digital-to-analog converter (DAC) (all not shown) configured to generated signals used by computer system 700. In some embodiments, analog/mixed-signal circuits 705 may also include radio frequency (RF) circuits that may be configured for operation with cellular telephone networks. Analog/mixed-signal circuits 705 may include one or more circuits capable of generating a reference voltage at a particular voltage level, such as a voltage regulator or band-gap voltage reference.

Power management unit 706 may be configured to generate a regulated voltage level on a power supply signal for processor complex 701, input/output circuits 703, memory circuit 702, and other circuits in computer system 700. In various embodiments, power management unit 706 may include one or more voltage regulator circuits, such as, e.g., a buck regulator circuit, configured to generate the regulated voltage level based on an external power supply (not shown). In some embodiments any suitable number of regulated voltage levels may be generated. Additionally, power management unit 706 may include various circuits for managing distribution of one or more power signals to the various circuits in computer system 700, including maintaining and adjusting voltage levels of these power signals. Power management unit 706 may include circuits for monitoring power usage by computer system 700, including determining or estimating power usage by particular circuits. In some embodiments, for example, power management unit 706 may include power management unit 208, or a portion thereof, while in other embodiments, power management unit 208 may be entirely included in processor 100.

It is noted that the embodiment illustrated in FIG. 7 includes one example of a computer system. A limited number of circuit blocks are illustrated for simplicity. In other embodiments, any suitable number and combination of circuit blocks may be included. For example, in other embodiments, security and/or cryptographic circuit blocks may be included.

Figure 8:
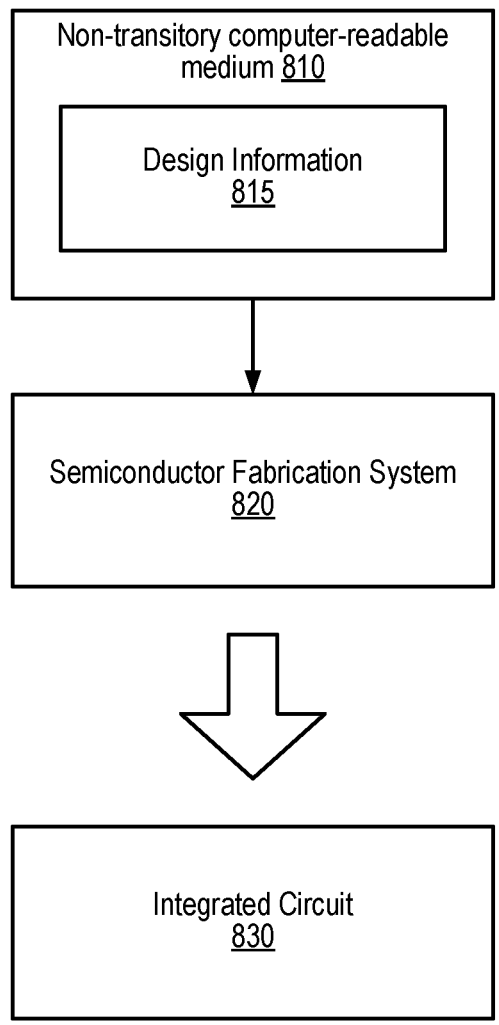
FIG. 8 shows a block diagram of an example computer-readable medium, according to some embodiments.

FIG. 8 is a block diagram illustrating an example of a non-transitory computer-readable storage medium that stores circuit design information, according to some embodiments. The embodiment of FIG. 8 may be utilized in a process to design and manufacture integrated circuits, such as, for example, an IC that includes computer system 700 of FIG. 7. In the illustrated embodiment, semiconductor fabrication system 820 is configured to process the design information 815 stored on non-transitory computer-readable storage medium 810 and fabricate integrated circuit 830 based on the design information 815.

Non-transitory computer-readable storage medium 810, may comprise any of various appropriate types of memory devices or storage devices. Non-transitory computer-readable storage medium 810 may be an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 810 may include other types of non-transitory memory as well or combinations thereof. Non-transitory computer-readable storage medium 810 may include two or more memory mediums which may reside in different locations, e.g., in different computer systems that are connected over a network.

Design information 815 may be specified using any of various appropriate computer languages, including hardware description languages such as, without limitation: VHDL, Verilog, SystemC, SystemVerilog, RHDL, M, MyHDL, etc. Design information 815 may be usable by semiconductor fabrication system 820 to fabricate at least a portion of integrated circuit 830. The format of design information 815 may be recognized by at least one semiconductor fabrication system, such as semiconductor fabrication system 820, for example. In some embodiments, design information 815 may include a netlist that specifies elements of a cell library, as well as their connectivity. One or more cell libraries used during logic synthesis of circuits included in integrated circuit 830 may also be included in design information 815. Such cell libraries may include information indicative of device or transistor level netlists, mask design data, characterization data, and the like, of cells included in the cell library.

Integrated circuit 830 may, in various embodiments, include one or more custom macrocells, such as memories, analog or mixed-signal circuits, and the like. In such cases, design information 815 may include information related to included macrocells. Such information may include, without limitation, schematics capture database, mask design data, behavioral models, and device or transistor level netlists. As used herein, mask design data may be formatted according to graphic data system (gdsii), or any other suitable format.

Semiconductor fabrication system 820 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 820 may also be configured to perform various testing of fabricated circuits for correct operation.

In various embodiments, integrated circuit 830 is configured to operate according to a circuit design specified by design information 815, which may include performing any of the functionality described herein. For example, integrated circuit 830 may include any of various elements shown or described herein. Further, integrated circuit 830 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

Unless stated otherwise, the specific embodiments are not intended to limit the scope of claims that are drafted based on this disclosure to the disclosed forms, even where only a single example is described with respect to a particular feature. The disclosed embodiments are thus intended to be illustrative rather than restrictive, absent any statements to the contrary. The application is intended to cover such alternatives, modifications, and equivalents that would be apparent to a person skilled in the art having the benefit of this disclosure.

Particular features, structures, or characteristics may be combined in any suitable manner consistent with this disclosure. The disclosure is thus intended to include any feature or combination of features disclosed herein (either explicitly or implicitly), or any generalization thereof. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

For example, while the appended dependent claims are drafted such that each depends on a single other claim, additional dependencies are also contemplated, including the following: Claim 3 (could depend from any of claims 1-2); claim 4 (any preceding claim); claim 5 (claim 4), etc. Where appropriate, it is also contemplated that claims drafted in one statutory type (e.g., apparatus) suggest corresponding claims of another statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to the singular forms such "a," "an," and "the" are intended to mean "one or more" unless the context clearly dictates otherwise. Reference to "an item" in a claim thus does not preclude additional instances of the item.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," covering x but not y, y but not x, and both x and y. On the hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one of element of the set [w, x, y, z], thereby covering all possible combinations in this list of options. This phrase is not to be interpreted to require that there is at least one instance of w, at least one instance of x, at least one instance of y, and at least one instance of z.

Various "labels" may proceed nouns in this disclosure. Unless context provides otherwise, different labels used for a feature (e.g., "first circuit," "second circuit," "particular circuit," "given circuit," etc.) refer to different instances of the feature. The labels "first," "second," and "third" when applied to a particular feature do not imply any type of ordering (e.g., spatial, temporal, logical, etc.), unless stated otherwise.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as "configured to" perform some task refers to something physical, such as a device, circuit, memory storing program instructions executable to implement the task, etc. This phrase is not used herein to refer to something intangible.

The hardware circuits may include any combination of combinatorial logic circuitry, clocked storage devices such as flops, registers, latches, etc., finite state machines, memory such as static random access memory or embedded dynamic random access memory, custom designed circuitry, analog circuitry, programmable logic arrays, etc. Similarly, various units/circuits/components may be described as performing a task or tasks, for convenience in the description. Such descriptions should be interpreted as including the phrase "configured to."

In an embodiment, hardware circuits in accordance with this disclosure may be implemented by coding the description of the circuit in a hardware description language (HDL) such as Verilog or VHDL. The HDL description may be synthesized against a library of cells designed for a given integrated circuit fabrication technology, and may be modified for timing, power, and other reasons to result in a final design database that may be transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and may further include other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA.

The term "configured to" is not intended to mean "configurable to." An unprogrammed FPGA, for example, would not be considered to be "configured to" perform some specific function. This unprogrammed FPGA may be "configurable to" perform that function, however.

Reciting in the appended claims that a structure is "configured to" perform one or more tasks is expressly intended not to invoke 35 U.S.C. § 112(f) for that claim element. Should Applicant wish to invoke Section 112(f) during prosecution, it will recite claim elements using the "means for" [performing a function] construct.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

What is claimed is:

1. An apparatus comprising:
    an execute circuit configured to execute a plurality of operations received from a queue;
    a power estimator circuit configured to:
        predict power consumption due to execution of a particular operation of the plurality of operations; and
        withdraw, based on the predicted power consumption, a first amount of power credits from a power credit pool;
    a power sensing circuit configured to:
        monitor one or more characteristics of a power supply node coupled to the execute circuit to generate a power value; and
        deposit a second amount of power credits into the power credit pool, wherein the second amount of power credits is based on the power value indicating that power consumed during the execution of the particular operation is less than the predicted power consumption.

2. The apparatus of claim 1, wherein the one or more characteristics include voltage droop on the power supply node, and wherein the power sensing circuit is further configured to determine the second amount of power credits based on an amount of monitored voltage droop during execution of the particular operation.

3. The apparatus of claim 1, wherein the power sensing circuit is further configured to suspend power credit deposits for a particular amount of time in response to a determination that a power supply overshoot event has occurred.

4. The apparatus of claim 1, wherein to generate the power value, the power sensing circuit is further configured to detect propagation of a signal transition through a series of logic gates.

5. The apparatus of claim 4, wherein to generate the power value, the power sensing circuit is further configured to generate a sensor value that is indicative of a number of the series of logic gates through which the signal transition has propagated after a particular amount of time.

6. The apparatus of claim 5, wherein the execute circuit includes a particular number of stages, and wherein the particular amount of time is based on the particular number of stages.

7. The apparatus of claim 1, wherein the power estimator circuit is further configured, based on an available amount of power credits in the power credit pool, to throttle a number of operations sent to the execution circuit over a particular amount of time.

8. The apparatus of claim 1, wherein the predicted power consumption is based on a worst-case power consumption for the particular operation.

9. A method comprising:
    estimating, by a power management circuit, power consumption of an execute circuit using a particular operation of a plurality of operations to be executed by the execute circuit;
    withdrawing, by the power management circuit based on the estimated power consumption, a first amount of power credits from a power credit pool;
    during execution of the particular operation, generating, by the power management circuit, a power value by monitoring one or more characteristics of a power supply node coupled to the execute circuit; and
    based on a comparison of the estimated power consumption and the power value, refunding, by the power management circuit, a second amount of power credits to the power credit pool.

10. The method of claim 9, wherein the one or more characteristics include voltage droop on the power supply node, and further comprising determining the second amount of power credits to refund based on an amount of monitored voltage droop during the execution of the particular operation.

11. The method of claim 9, wherein generating the power value, comprises determining a number of a series of logic gates through which a signal transition has propagated within a particular amount of time.

12. The method of claim 11, further comprising determining the particular amount of time using a count of cycles of a clock signal that is used by the execute circuit.

13. The method of claim 9, further comprising suspending power credit refunds for a particular amount of time in response to a determination that a power supply overshoot event has occurred.

14. The method of claim 9, further comprising modifying, by the power management circuit, the power value based on a determined operating temperature.

15. An apparatus comprising:
 a series of invertor circuits configured to delay propagation of a signal transition at an input of an initial invertor circuit of the series, wherein an amount of delay time through a particular invertor circuit of the series is based on a voltage level of a power supply node of an execute circuit;
 a logic circuit configured to detect a logic level at an output of a plurality of the series of invertor circuits; and
 a control circuit configured to:
  determine respective power values at a plurality of points in time using the detected logic levels; and
  using the respective power values, determine, for the execute circuit, a difference between estimated power consumption and actual power consumption.

16. The apparatus of claim 15, wherein the control circuit is further configured to refund, based on the determined difference, an amount of power credits for use by the execute circuit.

17. The apparatus of claim 16, wherein the control circuit is further configured to determine the amount of power credits to refund by comparing the determined difference to one or more threshold values.

18. The apparatus of claim 15, wherein to delay propagation of the signal transition, the series of invertor circuits are configured to increase the propagation delay in response to a decrease in the voltage level of the power supply node.

19. The apparatus of claim 15, wherein to determine a particular power value at a particular point in time, the control circuit is configured, using the detected logic levels, to determine a number of the series of invertor circuits through which the signal transition has propagated after a particular amount of time.

20. The apparatus of claim 15, wherein the control circuit is further configured determine the plurality of points in time using a count of cycles of a clock signal, wherein the clock signal is used by the execute circuit for performing operations.

* * * * *